United States Patent
Hirayama

(10) Patent No.: US 6,740,268 B2
(45) Date of Patent: May 25, 2004

(54) METHOD FOR CUTTING HONEYCOMB CORE

(75) Inventor: Akira Hirayama, Saitama-ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 316 days.

(21) Appl. No.: 09/933,828

(22) Filed: Aug. 22, 2001

(65) Prior Publication Data

US 2002/0024167 A1 Feb. 28, 2002

(30) Foreign Application Priority Data

Aug. 22, 2000 (JP) ........................ 2000-251557

(51) Int. Cl.⁷ .................. B26D 3/00; B29C 37/02
(52) U.S. Cl. ................. 264/28; 83/54; 264/28
(58) Field of Search ................. 264/28, 138; 83/54

(56) References Cited

U.S. PATENT DOCUMENTS

| | | |
|---|---|---|
| 2,905,064 A | 9/1959 | Nielsen et al. |
| 3,176,387 A | 4/1965 | Argueso, Jr. et al. |
| 3,413,708 A | 12/1968 | Norville et al. |

FOREIGN PATENT DOCUMENTS

| | | | | |
|---|---|---|---|---|
| JP | 52-97484 A | | 8/1977 | |
| JP | 3-251329 A | | 11/1991 | |
| JP | 04057675 A | * | 2/1992 | ............ 83/53 |
| JP | 06179195 A | * | 6/1994 | ............ 83/651 |

OTHER PUBLICATIONS

Patent Abstracts of Japan, JP 52097484, Aug. 16, 1977.
Patent Abstracts of Japan, JP 03251329, Nov. 8, 1991.
European Search Report for EP 01 30 7145 (Nov. 29, 2001).

* cited by examiner

*Primary Examiner*—Leo B. Tentoni
(74) *Attorney, Agent, or Firm*—Sughrue Mion, PLLC

(57) ABSTRACT

A method for cutting a honeycomb core which has a plurality of hollow tubular cells, wherein the method includes the steps of: filling or coating a hollow tubular cell of the honeycomb core with a resin composition that is in a gel state at an ordinary temperature; cooling the resin composition to a solid state; cutting the hollow tubular cell together with the resin composition in the solid state; allowing to stand or heating the resin composition to a gel state; and removing the resin composition in the gel state from the hollow tubular cell.

4 Claims, 2 Drawing Sheets

METHOD FOR CUTTING HONEYCOMB CORE

BACKGROUND OF THE INVENTION

The present invention relates to a method for cutting (or machining) a honeycomb core.

Honeycomb sandwich panels using fiber-reinforced composites (prepregs) are light in weight and high in strength, so that they have been widely used for automobiles, ships, aircrafts, etc. The honeycomb sandwich panels are generally produced by placing an assembly composed of a couple of skins made of a fiber-reinforced composite and a honeycomb core covered therewith on a forming tool, and by heating the assembly under a pressure to form it into a desired shape. An adhesive may be provided between the honeycomb core and the skins. The honeycomb core comprises a plurality of hollow tubular cells made of a fiber, etc., and appropriately cut into a desired shape beforehand. In general, at the edges of the honeycomb core is provided a tapered portion to prevent the edges from being deformed or crushed during the heating under a pressure.

Conventionally, the honeycomb core has been cut by a method comprising the steps of: fixing the honeycomb core on a workbench by a double faced adhesive tape; cutting the honeycomb core by a cutter; and finishing the cut surface by a sand paper. However, this method often results in poor form accuracy of the cut surface. The hollow tubular cells of the honeycomb core is not sufficient in hardness and strength, whereby the hollow tubular cells are pushed down and bent by the cutting part of the cutter. Thus, the cell walls in the cut surface result in inappropriate deformation such as crumpling, collapsing, burr, etc. Although excellent form accuracy can be obtained in the case of using a cutting apparatus exclusive to the honeycomb core, the cutting cost is inevitably increased in this case.

Under such a circumstances, disclosed in Japanese Patent Laid-Open No. 52-97484 was a method for cutting the honeycomb core with a high form accuracy, which comprises the steps of: filling the honeycomb core with such a material to be solidified as a thermoplastic resin, water, a paraffin, etc.; solidifying the material; cutting the honeycomb core and the solidified material; melting the solidified material; and removing the melt material from the honeycomb core. However, this method uses the liquid of a thermoplastic resin, etc. to be poor in workability. Further, the paraffin is often difficult to be removed from the honeycomb core after cutting.

A method using a polyethylene glycol having a melting point of 60 to 80° C. as the material to be solidified also has been known. However, the polyethylene glycol is often melt by cutting heat and peeled off from the honeycomb core when this method is applied to cutting operation for a thin material or a high speed cutting operation. Further, the polyethylene glycol gives a lot of trouble when it is washed and removed from the honeycomb core after cutting, whereby cost increase is unavoidable in this method.

In a method disclosed in Japanese Patent Laid-Open No. 3-251329, the hollow tubular cells of the honeycomb core are filled with a rigid plastic foam block made of a polyurethane foam, etc., and the honeycomb core is cut together therewith. The rigid plastic foam block is shoved with a pressure into the hollow tubular cells and cut by the cell walls of the cells, whereby it is filled in the honeycomb core. However, this method is usable only in the case where the honeycomb core is made of such a material that has a sufficient strength, a metal, etc. Further, the rigid plastic foam block is not easy to remove from the honeycomb core.

OBJECT AND SUMMARY OF THE INVENTION

An object of the present invention is to provide a method for easily cutting (machining) a honeycomb core with a reduced cost, excellent workability and high form accuracy, without using a cutting apparatus exclusive to the honeycomb core.

As a result of intensive research in view of the above object, the inventor has found that a honeycomb core is easily cut with a reduced cost, excellent workability and high form accuracy by filling or coating a hollow tubular cell of the honeycomb core with a gel and by solidifying the gel. The present invention has been accomplished by the finding.

Thus, a method of the present invention, which is for cutting a honeycomb core comprising a plurality of hollow tubular cells, comprises the steps of: filling or coating a hollow tubular cell of the honeycomb core with a resin composition that is in a gel state at an ordinary temperature; cooling the resin composition to a solid state; cutting the hollow tubular cell together with the resin composition in the solid state; allowing to stand or heating the resin composition to a gel state; and removing the resin composition in the gel state from the hollow tubular cell. The method of the present invention uses the resin composition in the gel state as the material to be solidified, thereby having an advantage in that the material is easy to handle and remove from the honeycomb core after cutting.

In the method for cutting a honeycomb core according to the present invention, the resin composition is particularly preferably changed from the gel state to the solid state at −20 to 0° C. Further, the resin composition preferably comprises a water-absorbing resin and water.

DETAILED DESCRIPTION OF THE PREFERRED EMBODIMENTS

A method of the present invention is for cutting (or machining) a honeycomb core comprising a plurality of hollow tubular cells. The method comprises the steps of: filling or coating a hollow tubular cell of the honeycomb core with a resin composition that is in a gel state at an ordinary temperature; cooling the resin composition to a solid state; cutting the hollow tubular cell together with the resin composition in the solid state; allowing to stand or heating the resin composition to a gel state; and removing the resin composition in the gel state from the hollow tubular cell.

Honeycomb cores having a various structure such as a hexagon honeycomb structure, an over-expand honeycomb structure, a flex core honeycomb structure, a square honeycomb structure, an under-expand honeycomb structure, etc. can be cut with high accuracy by the method of the present invention. The honeycomb core may be made of a paper that is optionally impregnated with a resin, a fiber that is optionally impregnated with a resin, a rubber, a synthetic resin, a metal, etc. Examples of the metal used for the honeycomb core include aluminum, steels, soft metals such as lead, etc. In the case where the honeycomb core is used for a honeycomb sandwich panel composing an aircraft, it is preferably made of an aramid fiber-reinforced phenolic resin having a high specific strength. Shape and thickness of the honeycomb core are not particularly limited before and after the cutting operation.

Various products and components other than the honeycomb core can be cut by the method according to the present invention. For example, an assembly composed of metal plates can be preferably cut by the method of the present invention.

Figure 1A:
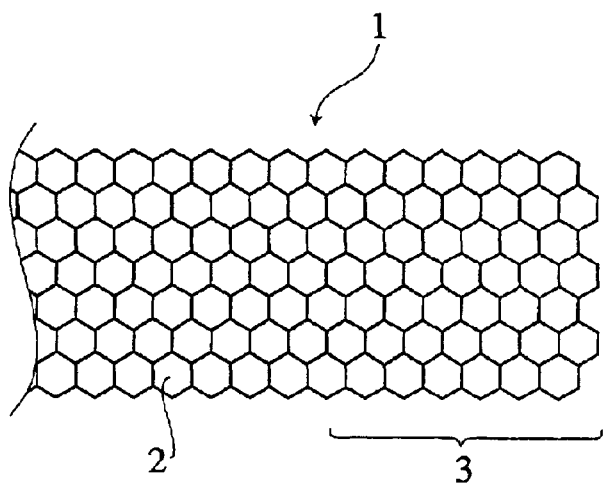
FIG. 1(a) is a partial top view showing an example of a honeycomb core having a hexagon honeycomb structure.
Figure 1B:
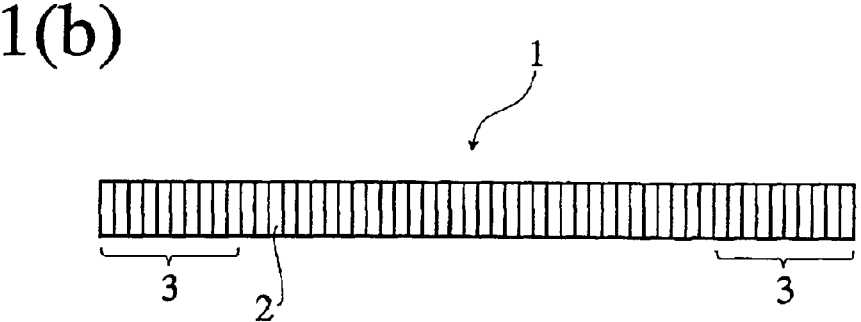
FIG. 1(b) is a side view showing the honeycomb core of FIG. 1(a)

FIG. 1(a) is a partial top view showing an example of a honeycomb core having a hexagon honeycomb structure, and FIG. 1(b) is a side view showing the same. The honeycomb core 1 shown in FIGS. 1(a) and 1(b) comprises a plurality of hollow tubular cells 2 and portions 3 to be cut, which is hereinafter referred to as "cutting portion 3". The method according to the present invention will be explained in more detail below without intention of restricting the scope of the present invention, with reference to an example where the cutting portions 3 of the honeycomb core 1 shown in FIGS. 1(a) and 1(b) is cut to form tapered portions 4 shown in FIG. 2.

(a) Filling or Coating Process

Figure 3A:
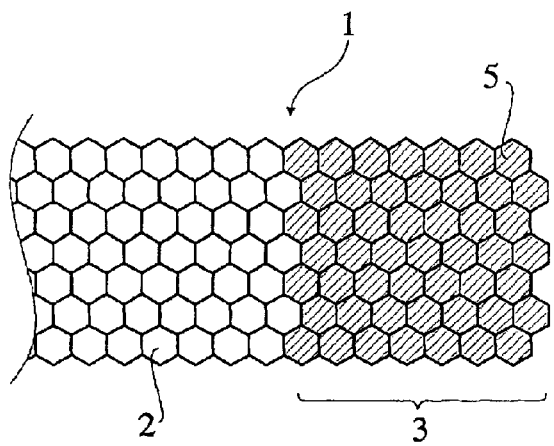
FIG. 3(a) is a partial top view showing the honeycomb core of FIG. 1(a) partially filled with a resin composition.
Figure 3B:
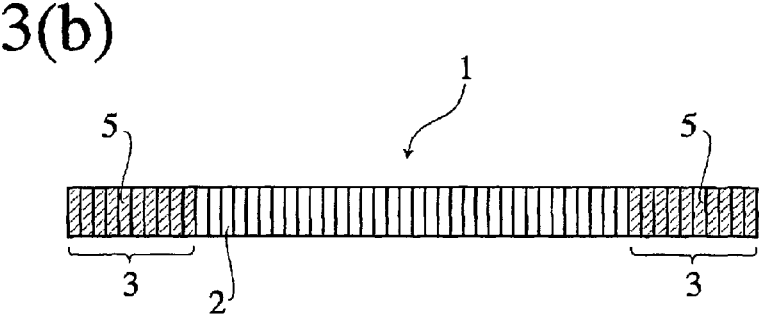
FIG. 3(b) is a side view showing the honeycomb core of FIG. 3(a)

As shown in FIGS. 3(a) and 3(b), the hollow tubular cells 2 placed in the cutting portions 3 of the honeycomb core 1 are filled or coated with a resin composition 5. The resin composition is in a gel state at an ordinary temperature. The hollow tubular cells 2 that are not provided within the cutting portions 3 may also be filled or coated with the resin composition 5. The method of the present invention uses the resin composition in a gel state as material to be solidified. The resin composition in the gel state is remarkably easy to handle and remove from the honeycomb core after cutting as compared with the liquids such as water used in the conventional methods. In the present invention, "the resin composition is in gel state" means that the shape of the resin composition can be freely or optionally changed and that the resin composition does not flow out. Further, "ordinary temperature" is 13 to 35° C. in this invention.

In the case where the honeycomb core has a large thickness, it is preferred that an air-removing pad is provided under the honeycomb core while filling or coating it with the resin composition from the viewpoint of facilitation of the filling or coating process.

(b) Cooling Process

The resin composition 5 is cooled to the solid state after the hollow tubular cells 2 placed in the cutting portions 3 are filled or coated therewith. The resin composition may be cooled by means of a freezing chamber, a dry ice, a cold spray, etc. Deformation of the honeycomb core due to the difference of thermal expansivity between the honeycomb core and the resin composition is remarkably slight, a negligible quantity. The honeycomb core and the resin composition become in one body by cooling, whereby they are easily fixed to a workbench, a machine bed, etc. Cooling temperature and cooling period may be appropriately selected depending on the physical properties of the resin composition. In general, it is preferred that the resin composition is cooled at −20 to −10° C. for 6 to 8 hours.

Figure 4:
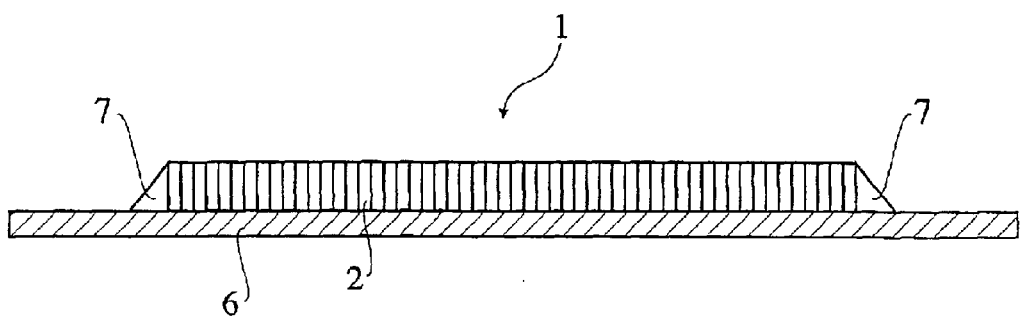
FIG. 4 is a side view showing a base plate and a resin composition fillet that may be used in the method of the present invention.

As shown in FIG. 4, the honeycomb core 1 is preferably disposed on a base plate 6 made of a combination material, wood, etc. before cooling. Further, a resin composition fillet 7 is preferably provided around the whole side surfaces of the honeycomb core 1. This enables the honeycomb core 1 to be cut without a fixing tool such as a clamp, etc.

The resin composition used in the present invention is changed from the gel state to the solid state preferably at 0° C. or less, particularly preferably at −20 to 0° C. When this temperature is less than −20° C., the resin composition is difficult to change from the gel state to the solid state. If the temperature is more than the ordinary temperature, the resin composition is not easy to handle during the filling or coating process.

The resin composition used in the present invention preferably comprises a water-absorbing resin and water. Examples of the water-absorbing resin include nylon resins, polyolefin resins, acrylic resins, resins containing starch as a main component, etc. Of these resins, preferred are the resins containing starch as a main component. Specifically, preferably used in the present invention as the resin composition or the water-absorbing resin are: "Cool Ace" manufactured by Cowback K.K., composed of an oriented nylon and a low-density polyethylene; "Aquamate" manufactured by Sekisui Plastics Co. Ltd., composed of sodium acrylate (50 to 80 mol %) and an acrylic component (20 to 50 mol %); "SANFRESH ST-100" manufactured by Sanyo Chemical Industries Ltd., composed of a starch-acrylic acid graft polymer partially containing sodium salt moiety; etc. Among them, SANFRESH ST-100 is particularly preferred.

In the resin composition, the weight ratio of water to the water-absorbing resin is preferably 400/1 to 1000/1. When the weight ratio is 400/1 or more, the mixture of water and the water-absorbing resin is in a gel state. The weight ratio of less than 400/1 results in blocking. In general, the resin composition is changed from the gel state to the solid state trough a sherbet-like state by cooling. Although it is preferable that the resin composition is changed to the solid state by cooling completely, the resin composition may contain a portion in the gel state or the sherbet-like state after cooling if it has a strength sufficient for cutting the honeycomb core with high accuracy.

The resin composition may comprise an additive such as a coloring agent other than the water-absorbing resin and water.

(c) Cutting Process

The honeycomb core is then cut together with the solidified resin composition. According to the method of the present invention, the cutting portions of the honeycomb core are smoothly cut without such a deformation of the cell walls as crumpling, collapsing, burr, etc.

Figure 2:
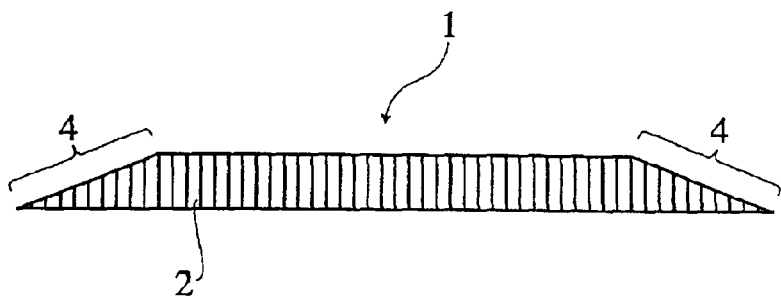
FIG. 2 is a side view showing a honeycomb core having tapered portions provided by cutting the honeycomb core of FIG. 1(b)

The honeycomb core can be cut with a high accuracy by means of conventional machining apparatus, woodwork apparatus, etc. without using a apparatus exclusive to the honeycomb core in this invention. The honeycomb core may be cut by a general hand tool. In the case where the edges of the honeycomb core is cut to form the tapered portions 4 as shown in FIG. 2, the cutting may be achieved by a conventional chisel with trowel. Further, a circular sawing machine may be used for breaking the honeycomb core, and a router or a trimming machine may be used for controlling the thickness of the honeycomb core.

The cutting process is preferably carried out as soon as possible after cooling. The cutting process is carried out preferably within 1 hour after cooling, more preferably within 40 minutes after cooling.

(d) Removing Process

The solidified resin composition and the honeycomb core is allowed to stand or heated, whereby the resin composition is changed to a gel state and removed from the core. The resin composition may be changed from the solid state to the gel state by leaving at the ordinary temperature for 3 to 5 hours. In an urgent case, the resin composition may be heated by an oven, hot water, cold water, etc. Deformation of the honeycomb core due to the difference of thermal expansivity between the honeycomb core and the resin composition is not observed in this process.

The resin composition is more easily removed from the honeycomb core in the gel state as compared with the polyethylene glycol and the rigid plastic foam block used in the conventional methods. The gelled resin composition may be removed by lightly shaking off the composition from the honeycomb core, by blowing air over the composition, or by lightly hitting the honeycomb core. The removed resin composition may be repeatedly used.

Though the present invention has been explained above with reference to the attached drawings, the present invention is not restricted thereto and any variations and modifications are possible unless the scope and spirit of the present invention are changed.

As described in detail above, a honeycomb core is cut with high form accuracy by a method of the present invention. A resin composition used in the present invention as a material to be solidified is handled with excellent workability and easily removed from the resultant honeycomb core after cutting. The method of the present invention uses only a conventional, usual cutting tool or apparatus without a cutting apparatus exclusive to the honeycomb core, thereby reducing cutting cost.

What is claimed is:

1. A method for cutting a honeycomb core comprising a plurality of hollow tubular cells, wherein said method comprises the steps of: filling or coating a hollow tubular cell of said honeycomb core with a resin composition that is in a gel state at an ordinary temperature; cooling said resin composition to a solid state; cutting said hollow tubular cell together with said resin composition in said solid state; changing the resin composition from a solid state to a gel state by allowing the resin composition to stand at ordinary temperature or heating the resin composition to change the resin composition from a solid state to a gel state; and removing said resin composition in said gel state from said hollow tubular cell.

2. The method for cutting a honeycomb core according to claim 1, wherein said resin composition is changed from a gel state to a solid state at −20 to 0° C.

3. The method for cutting a honeycomb core according to claim 1, wherein said resin composition comprises a water-absorbing resin and water.

4. The method for cutting a honeycomb core according to claim 2, wherein said resin composition comprises a water-absorbing resin and water.

\* \* \* \* \*